July 31, 1956 D. V. MAZZOCCO 2,756,529
DISPLAY DEVICE
Filed April 26, 1952 3 Sheets-Sheet 1
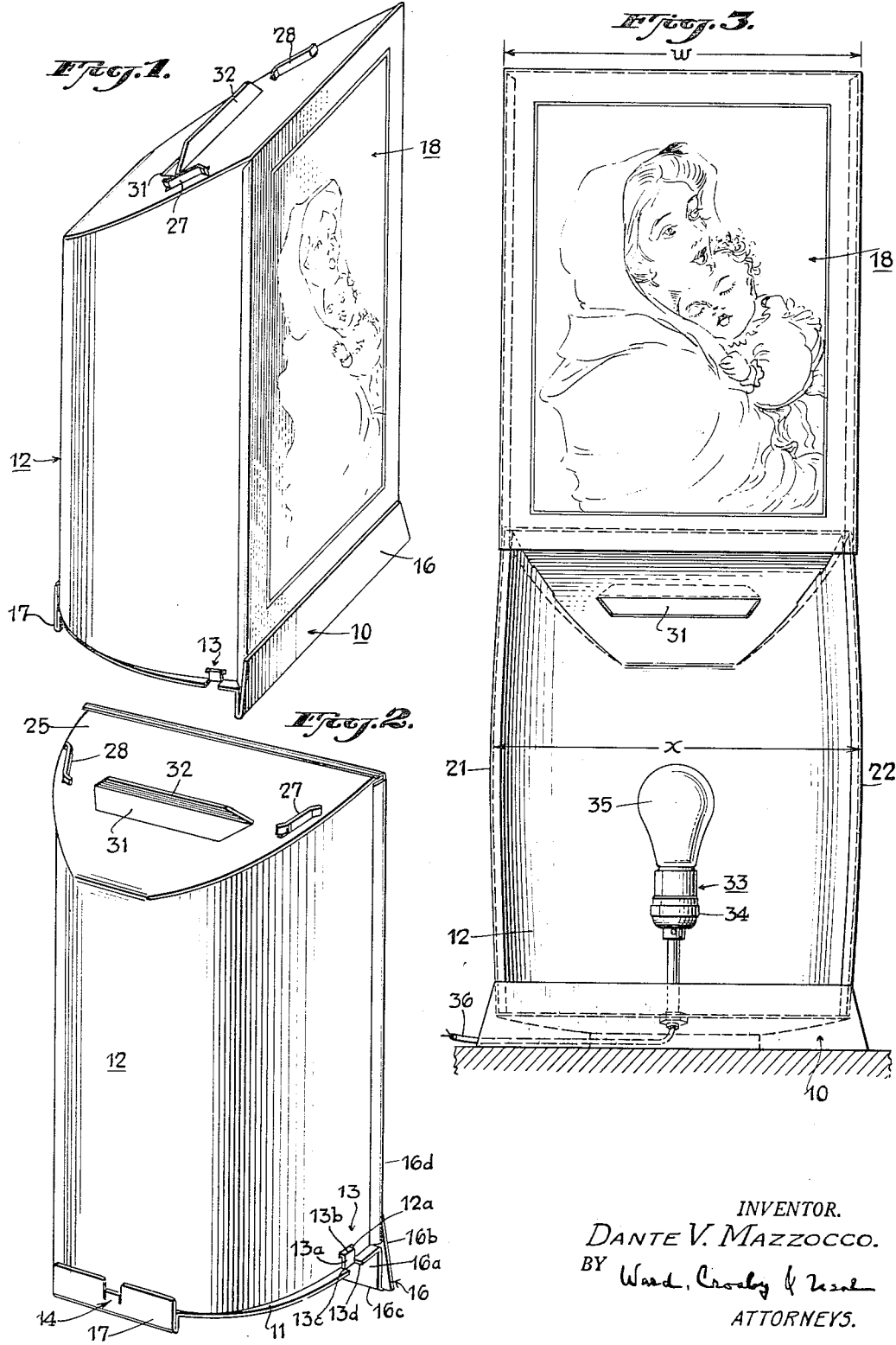
INVENTOR.
DANTE V. MAZZOCCO.
BY Ward, Crosby & Neal
ATTORNEYS.

July 31, 1956 — D. V. MAZZOCCO — 2,756,529
DISPLAY DEVICE

Filed April 26, 1952 — 3 Sheets-Sheet 2

INVENTOR.
DANTE V. MAZZOCCO.
BY Ward, Crosby & Neal
ATTORNEYS.

July 31, 1956  D. V. MAZZOCCO  2,756,529
DISPLAY DEVICE
Filed April 26, 1952  3 Sheets-Sheet 3
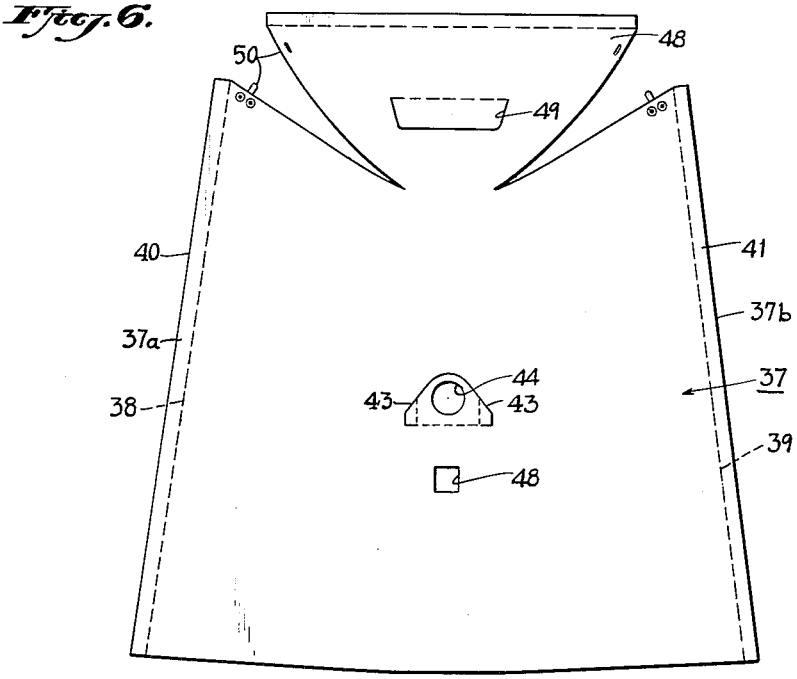
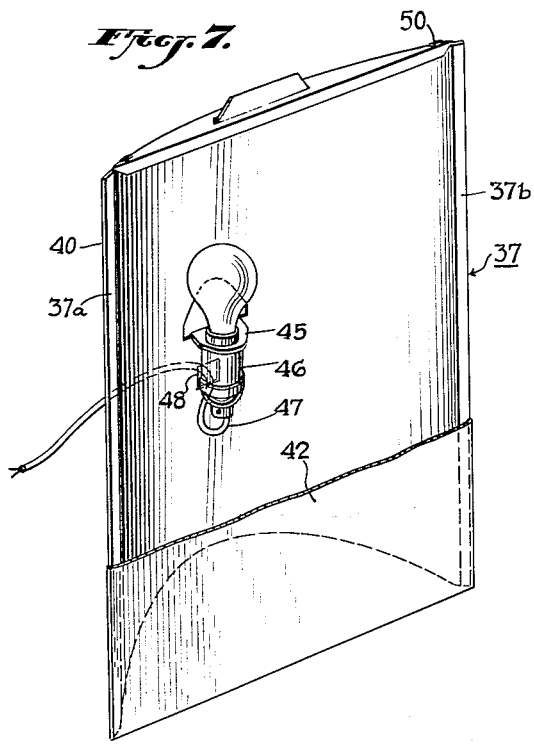
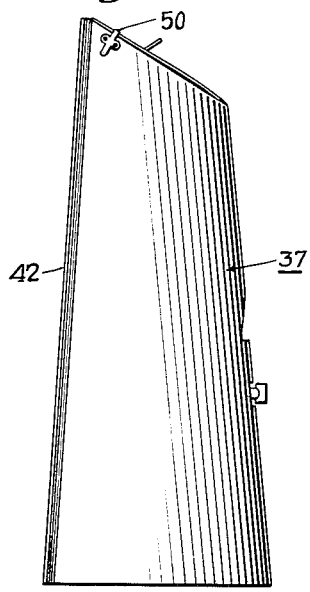
INVENTOR.
DANTE V. MAZZOCCO.
BY
ATTORNEYS.

United States Patent Office 2,756,529
Patented July 31, 1956

2,756,529

DISPLAY DEVICE

Dante V. Mazzocco, Bronx, N. Y.

Application April 26, 1952, Serial No. 284,523

2 Claims. (Cl. 40—152.2)

This invention relates to a display device, and more particularly to a so-called "shadow box" having novel means for mounting a transparency bearing a picture thereupon for public display assisted by lamp means which are situated behind the transparency.

Apparatus of this character heretofore suggested have been of undesirably high cost due to their complicated nature and also have been of unnecessarily large weight and bulk.

Furthermore, apparatus of this general type heretofore proposed, due to their bulk and weight, have been relatively difficult and expensive to pack and ship.

Also, only relatively expensive and complicated means have been suggested in the past for securing the transparency to the supporting means therefor.

One of the objects of the present invention is to overcome the above difficulties or to reduce same to insignificance.

The invention in one aspect thereof comprises: A so-called shadow box for display of a picture upon a transparency and includes a base member which preferably is of adequate weight to give suitable security from overturning of the structure. A backing member is secured to the base member, the backing member being preferably of stiff but bendable sheet material, such as cardboard, and having two opposite flanged side edges and also a base edge. The backing member is secured to the base member along the base edge thereof to form a concave structure in which is positioned suitable lamp means for illuminating the aforementioned transparency. Such positioning of the base edge of the backing member upon the base member positions the edges of the flanges thereof in substantially parallel relation, the flanges extending away from one another. The transparency is associated with the backing member by means of a pair of inturned channels which are formed preferably integral therewith along two opposite sides thereof, the inturned channels being engaged by the respective flanges of the backing member. The transparency is thus supported by the backing member with the lamp means interposed therebetween. A suitable cap or sealing member may be employed covering the box-like structure formed by said base and backing members and the transparency whereby a substantial escape of light from said lamp means is prevented.

Various further and more specific objects, features and advantages of the invention will clearly appear from the detailed description given below taken in connection with the accompanying drawings which form a part of this specification and illustrate, by way of example, preferred arrangements of elements for carrying out the invention. The invention consists in such novel combinations of features as may be shown and described in connection with the device herein disclosed.

In the drawings:

Fig. 1 is a perspective view of one form of apparatus embodying the invention, such view being from obliquely to one side of the front of the device;

Fig. 2 is a perspective view of the apparatus shown in Fig. 1 being from the rear of the device;

Fig. 3 is a front elevation of the device shown in Fig. 1 with one element thereof, namely, the transparency, in a partially disassembled position;

Fig. 6 is a front view of another type of backing member employed in this device, such member also being shown in a flattened condition;

Fig. 7 is a perspective view, with parts cut away, of a modification of the invention employing the backing member of Fig. 6; and Fig. 8 is a side view of the device shown in Fig. 7.

Figure 4:
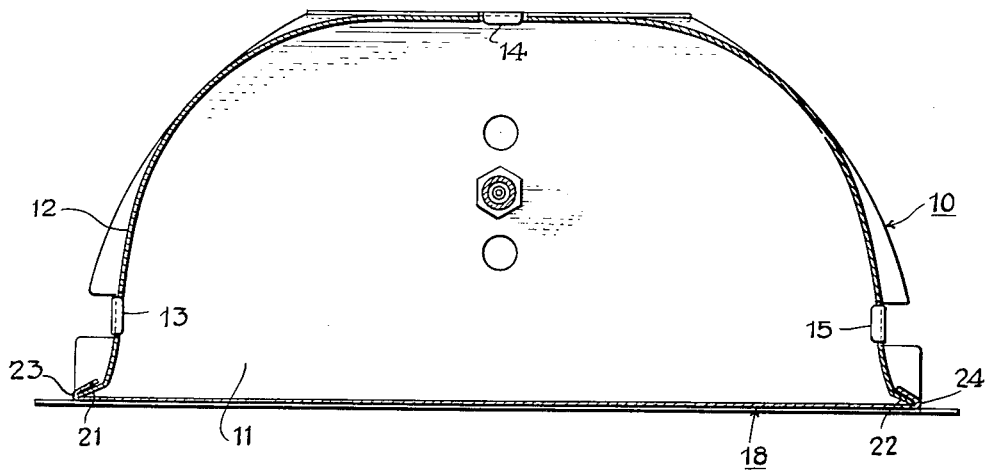
Fig. 4 is a horizontal sectional view taken through the device shown in Fig. 1.

Referring to the drawings, particularly Figs. 1 and 2, there is shown a so-called "shadow box" constructed for the purpose of displaying a so-called transparency. The term "shadow box" as employed herein refers to a box-like structure for supporting a transparency for such display and for supporting suitable lamp means within the box whereby the transparency is lighted from within, that is, lighted wherein the transparency is interposed between the light source and the viewer. The term "transparency" as employed herein refers to a translucent element of sheet material intended to be viewed with the aid of light showing through it, such sheet material bearing a picture or a device, for example, for public display. The sheet material, for example, can be of a vinyl resin, thin cloth, parchment paper or the like. The aforementioned shadow box embodying one form of the present invention comprises a base member 10 preferably of sheet material thereby to provide adequate weight to give the shadow box some security from overturning when positioned, for example, in a show window. In the form shown, the base member 10 consists of a substantially semicircular portion 11 preferably stamped from flat sheet metal. Suitable means are provided for securing to the base member 10 a transparency supporting backing member 12, to be described hereinafter, such securing means comprising three fingers 13, 14 and 15 (Fig. 4) which are preferably integral with the base member 10 and which may be at least part formed by the same stamping operation which stamps out the semicircular portion 11. The fingers 13, 14 and 15 are conformed to engage suitable perforations 12a, 12b and 12c (Fig. 5) formed along the margin of a base edge of the backing member 12.

The details of a preferred finger construction are shown in Fig. 2 with respect to finger 13, wherein it will be observed that the finger consists of a vertical upstanding portion 13a and a substantially horizontal inturned portion 13b, the latter being that portion which protrudes into the perforation 12a. The entire finger 13 preferably is formed by cutting or slitting the semicircular base member 11 along two parallel lines, as at 13c and 13d, and thereafter bending the finger into the above-described shape.

I have found it desirable to provide a means for elevating the semicircular base portion 11 slightly above the level of a supporting surface by means of front and rear flanges indicated at 16 and 17, respectively, which preferably are integral with the semicircular portion 11 and initially are coplanar therewith, that is, the entire base portion, including the flange forming parts thereof, can be stamped from a single flat piece of sheet metal, such flanges being bent into the shapes shown by well known means. The front flange 16, for example, comprises an inner portion 16a which extends downwardly from the front margin of the semicircular portion 11, and a face or front portion 16b joined with the portion 16a along a lower edge thereof 16c, the face flange portion extending substantially vertically to a level 16d which is preferably well above the level of the semicircular base portion 11. The rear flange 17 is formed analogously to the front flange 16 with the exception that the finger 14 is formed centrally thereof from the central and upper or outer portion thereof in a manner analogous to the formation of the finger 13.

In order very substantially to increase the ease of packaging and shipping the shadow box embodying the invention, the aforementioned backing member 12 preferably is stamped by means of a die from sheet material, such as cardboard, suitable plastic or the like. Such stamping of the backing member 12 is effected when the sheet material is flat. The backing member can thereafter be shipped when flat and later bent into a desired shape for assembly with the base member. The relative ease of packing and shipping this device is further enhanced by the flat conformation of a transparency generally indicated at 18, to be described more fully hereinafter, such transparency being easily detachable from and novelly associated with the backing member 12.

Figure 5:
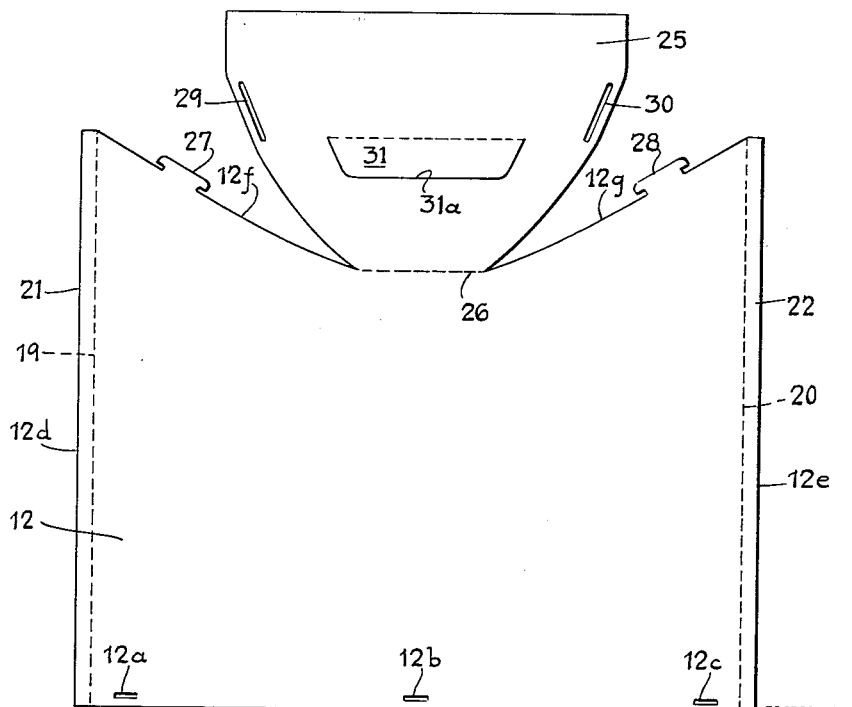
Fig. 5 is a front view of a backing member employed in the above device, said backing member being in a flattened condition.

A preferred initial shape of the backing member 12 is shown in detail in Fig. 5 wherein such member is illustrated while in a flattened condition, for example, immediately after being formed by means of a die from a flat piece of sheet stock, such as the aforementioned stiffened paper, plastic or the like.

The backing member 12 is scored by well known means to form along the front face thereof weakened or score lines, as at 19 and 20, respectively, along and near two opposite edges thereof 12d and 12e, respectively, which, in the form shown, constitute side edges which normally are in a substantially vertical attitude. The score lines 19 and 20 facilitate the formation respectively of flanges 21 and 22 which, of course, are integral with the backing member 12 and each of which may be bent slightly out of alignment with the adjacent portions of the backing member as is well shown in Fig. 4. Such flanges, which are so bent out of alignment, comprise means for gripping inturned channels 23 and 24, respectively, which are formed along opposite edges of the aoforementioned transparency 18 (Fig. 4) whereby the transparency is supported for display. It is, of course, understood that the backing member 12 may be associated in assembled relationship with the base member 10 by means of the fingers 13–15, inclusive, as shown in Fig. 4, prior to the engaging of the inturned channels 23 and 24 with the flanges 21 and 22.

The material from which the backing member is formed preferably is stiff but resilient sheet material which when die cut from a flat piece thereof (Fig. 5) can be bowed or bent into the shape shown in Fig. 4 for assembled relation with the base member. Thus, in one aspect of the invention, the backing member, by virtue of such resiliency, will tend to resume its initial flat shape, thereby assisting in maintaining the backing member in engagement with the fingers 13–15, inclusive, because of the positioning of the base edge of the backing member interiorly of such fingers as in said Fig. 4.

If desired, there may be formed concurrently with the backing member 12 a cap or top member 25 which is integral therewith and hinged thereto, for example, along a weakened or score line 26. The cap member 25 is preferably flat and shaped to form a suitable roof means for the shadow box when the backing member is in assembled relation with the transparency 18 or the base member 10. If desired, suitable means may be provided for securing upper edges 12f and 12g of the backing member to the edges of the cap member 25, for example, by means of T-shaped members or tongues 27 and 28 which are positioned for engaging slots 29 and 30 formed in the cap member 25. The extremities of the T-shaped members 27 and 28 can be bent out of alignment with the main body thereof, as is well shown in Fig. 2, thereby to secure the cap member 25 into its desired position. A ventilating port 31 can be formed in the cap member 25 by cutting the cap member along the line 31a thereby forming a flap 32 which can be bent out of the plane of the cap member thereby opening the port 31.

The transparency 18 is formed preferably from a material in which the inturned channels 23 and 24 can be made integral therewith and formed simply by bending the appropriate opposite marginal portions thereof under suitable circumstances which may require heat and pressure. However, it is desirable to form such channels without the use of heat. The transparency, for example, can be of a plastic substance, such as a vinyl resin known commercially as Vinylite, or it can be of Celluloid or thick parchment paper. Any suitable translucent sheet material can be employed, but as aforementioned a preferred embodiment employs a sheet material wherein said inturned channels can be formed integrally therewith by bending marginal portions into channel form while unheated.

Referring now to Fig. 3, it will be seen that the flanges 21 and 22 are slightly bowed with respect to a central vertical axis, such attitude being the result of the resiliency of the sheet material from which the backing member 12 is made, wherein the backing member tends to assume its orignal flat shape. The backing member, of course, is secured along its base edge to the base member 10 (Fig. 3) thereby restraining the base edge region of the backing member. The top marginal region of the backing member is restrained in a desired manner by means of the aforementioned tongues and slots 27–30. The distance "x" between the outermost edges of the flanges 21 and 22 at the mid-region thereof, in this particular form of the invention wherein such bowed flange condition exists, is slightly in excess of the width "w" of the transparency 18 as measured between corresponding points at the bottom of the inturned channels thereof 23 and 24. Thus the flanges 21 and 22 must be slightly bent inwardly in order to engage the inturned channels 23 and 24, as is well illustrated in Fig. 3. Consequently as the transparency 18 is thrust into position by sliding same relative to the flanges (downwardly in Fig. 3), the transparency will be placed under tension. This is a desirable relationship between the backing member and the transparency because the latter, which may be of thin sheet material, is prevented from wrinkling and the display of the picture or device thereon is facilitated.

Suitable lamp means are mounted in the chamber formed by the backing member and are indicated generally at 33. Such means includes a socket 34 for an incandescent lamp 35, such socket being secured by any suitable means to the base member 10 and provided with a suitable electrical connection 36 whereby the incandescent light can be connected to a source of electric energy (not shown).

In the form of the invention described above, there was employed a base member 10 preferably of sheet metal of a desired weight. I have found it desirable, in order to lessen substantially the cost of the shadow box, to eliminate from one form thereof such a base member. An embodiment so eliminating the base member is shown in Figs. 7 and 8. The so-called "backing member" therefor, preferably of stiff paperboard or the like, is shown in Fig. 6, indicated generally at 37, which is substantially similar to the backing member shown in Fig. 5 with the exception that the side edges thereof 37a and 37b, instead of being substantially vertical when in a flattened condition, are inclined slightly towards a central axis. The reason for this is to impart to the shadow box, when it is assembled with a transparency mounted thereon, the conformation of a portion of a cone. That is, the rounded portions of the shadow box are substantially conical, being of substantially larger diameter at the base than at the top region thereof.

The backing member 37 is also scored by well known means along the front face thereof to form weakened score lines, as at 38 and 39, which lines are analogous to lines 19 and 20 above described. Such score lines 38 and 39 facilitate the formation of flanges 40 and 41, respectively. These flanges, which are bent slightly out of alignment with adjacent portions of the backing member, comprise means for gripping inturned channels which are formed along opposite edges of an aforementioned transparency as at 42 (Fig. 7).

In the form shown in Figs. 6–8, a mounting for an electric socket is employed which is cut from the backing member 37. For example, when such backing member is initially formed, the cut line 43 can be cut by suitable knife means. A suitable punch can cut away a circular portion thereby forming the circular aperture, as at 44, which is located in the tab-shaped element formed by the cut line 43. Such tab is designated, as at 45 (Fig. 7), and is referred to as a socket-tab.

An electric lamp socket, as at 46, has the neck thereof secured within the circular aperture 44 and mounted therein by any suitable clamping means or it is possible for friction to hold the socket in place or, if the material of the backing member 37 is sufficiently rigid, the electric lamp socket 46 can be held therein by direct threaded engagement therewith. An electric lead 47 from the socket 46 passes out of the shadow box by a suitable aperture, as at 48.

The backing member 37 is provided with a top member or cap, as at 48, having a ventilation port, as at 49. The cap 48 can be secured to the remainder of the device by any suitable fastening means, as at 50.

There is thus provided a novel display device of the so-called "shadow box" variety which is extraordinarily simple in construction and which can be manufactured by mass production techniques at heretofore unattained low cost. Furthermore, the novel device is so conformed that the elements thereof can be assembled in an extremely short time, the backing member and the transparency being associated in a novel manner whereby they can be quickly associated in assembled relation and can be similarly dissociated. Also, the parts of the apparatus are particularly adapted for inexpensive and easy packing and shipment due to the light weight and flattenable nature of the backing member and the transparency.

While the invention has been defined with respect to a certain preferred example which has given satisfactory results, it will be understood by those skilled in the art that various changes and modifications can be made without departing from the spirit and scope of the invention, and it is intended therefore in the appended claims to cover all such changes and modifications.

What is claimed as new and is desired to be secured by Letters Patent is:

1. In a shadow box, a base member having inturned fingers; a backing member formed of initially flat stiff but bendable resilient sheet material having perforations formed along a base edge thereof for cooperation with said inturned fingers whereby said backing member is held in bowed assembled relation with said base member, said base edge of the backing member being positioned interiorly of base portions of said inturned fingers, said backing member having flanges formed along two opposite side edges thereof, such flanges being positioned out of alignment with the regions of said backing member respectively adjacent thereto; a flat transparency of sheet material having inturned channels formed integral therewith along the two opposite edges thereof for engaging said backing member flanges for supporting the transparency said transparency being composed of flexible sheet material capable of permitting the passage of light therethrough and having sufficient stiffness and body to take a permanent set when bent along such opposite edges to form such inturned channels and having sufficient strength when so bent to retain said flanges when inserted therein, said resilient backing member when so held by said base member in bowed configuration and so associated with said flexible sheet transparency holds the latter taut; and lamp means positioned in the chamber formed by said transparency and members.

2. In a device of the class described, a base member having a supporting surface and a plurality of finger members positioned above such surface; a backing member of flexible resilient sheet material having a base edge and two opposite side edges, said base edge having a like plurality of perforations therein into which corresponding of said fingers extend for holding said backing member in assembled relation with said base member, said backing member being initially formed in substantially flat shape but being held in a curvilinear shape by said fingers, said backing member being scored along and near each of said side edges to form along each such edge a marginal flange, each of the latter being bent out of alignment with the respective adjacent parts of the backing member and each being in a separate but common plane; a transparency having inturned channels formed integral therewith along opposite side edges thereof, said marginal flanges engaging corresponding of said inturned channels thereby firmly supporting said transparency; said transparency being composed of flexible sheet material capable of permitting the passage of light therethrough and having sufficient stiffness and body to take a permanent set when bent to form such inturned channels and having sufficient strength when so bent to retain said marginal flanges when inserted therein, the front face of said backing member, prior to the fitting of said transparency thereto and when so held by said base in curvilinear shape, having a linear dimension from a point on the outer edge of one of said flanges to a corresponding and opposite point on the other flange which is in excess of the dimension between opposite points in the bottoms of said inturned channels, whereby said backing member is the sole means for supporting and holding taut said transparency and electric lamp socket means interposed between said backing member and said transparency for supporting electric lamp means for illuminating said transparency.

References Cited in the file of this patent

UNITED STATES PATENTS

| | | |
|---|---|---|
| 1,199,378 | Harvey | Sept. 26, 1916 |
| 1,488,314 | Carraine | Mar. 25, 1924 |
| 1,625,708 | Carraine | Apr. 19, 1927 |
| 2,165,550 | Howenstine | July 11, 1939 |
| 2,434,860 | Oxley | Jan. 20, 1948 |
| 2,443,645 | Turan | June 22, 1948 |
| 2,623,314 | Lombard | Dec. 30, 1952 |

FOREIGN PATENTS

| | | |
|---|---|---|
| 346,060 | Italy | Jan. 25, 1937 |
| 986,143 | France | July 1, 1951 |